United States Patent [19]

Bailey, Jr.

[11] Patent Number: 4,893,587
[45] Date of Patent: Jan. 16, 1990

[54] URINE COLLECTION DEVICE

[76] Inventor: Aubrey Bailey, Jr., 3341 South 42nd, Omaha, Nebr. 68506

[21] Appl. No.: 247,726

[22] Filed: Sep. 22, 1988

[51] Int. Cl.⁴ ............................................. A01K 23/00
[52] U.S. Cl. ....................................................... 119/95
[58] Field of Search .................... 119/95, 143; 604/395

[56] References Cited

U.S. PATENT DOCUMENTS

| | | | |
|---|---|---|---|
| 337,181 | 3/1886 | McDonough | 119/95 |
| 474,559 | 5/1892 | Kellogg | 119/95 |
| 1,162,357 | 11/1915 | Horiuch | 119/95 |
| 2,173,356 | 9/1939 | Cross | 119/95 |
| 2,190,115 | 2/1940 | Fuqua | 119/143 |
| 2,472,186 | 6/1949 | Arnold | 119/95 |
| 2,544,341 | 3/1951 | McGraw | 119/95 |
| 3,036,553 | 5/1962 | Gandier | 119/95 |
| 3,090,356 | 5/1963 | Andrisani | 119/95 |
| 3,786,787 | 1/1974 | Weinberger | 119/95 |
| 3,792,687 | 2/1974 | Ehrman | 119/95 |
| 3,817,217 | 6/1974 | Matuka et al. | 119/95 |
| 4,095,562 | 6/1978 | Graham | 119/95 |
| 4,103,645 | 8/1978 | Tyler | 119/95 |
| 4,353,330 | 10/1982 | Baumgartner | 119/95 |
| 4,444,152 | 4/1984 | Berardo | 119/95 |
| 4,510,887 | 4/1985 | Lincoln et al. | 119/95 |
| 4,709,661 | 12/1987 | Mayle, Jr. | 119/95 |

FOREIGN PATENT DOCUMENTS

| | | | |
|---|---|---|---|
| 559568 | 7/1958 | Canada | 119/95 |
| 19094 | 10/1903 | United Kingdom | 119/143 |

*Primary Examiner*—Paul J. Hirsch
*Attorney, Agent, or Firm*—Zarley, McKee, Thomte, Voorhees & Sease

[57] ABSTRACT

An urine collection device includes a disposable collection bag removably mounted on a framework of flexible straps. The collection bag has a front portion and a back portion, the back portion extending upwardly beyond the front portion to form a back flap. The front and back portions are sealed along the bottom and sides so as to form a container, and further include a coacting continuous fastener along the open top portion of the front portion to selectively seal the container. The bag has a snap fastener in each of the four corners which may be selectively connected to cooperable snaps on the strap framework. The strap framework has a pair of horizontally oriented straps with clamps at each end, the clamps being connectable to a horse blanket draped over a horse. Each horizontal strap has a slide buckle so as to allow for the adjustment and length of the strap for different size horses.

7 Claims, 3 Drawing Sheets

URINE COLLECTION DEVICE

TECHNIAL FIELD OF THE INVENTION

This invention relates generally to an urine collecting device, and more particularly to collection devices which have removable sampling bags.

BACKGROUND OF THE INVENTION

The necessity for collecting urine samples from horses and other animals has become more important in recent years. Racetracks find it necessary to collect urine samples as one means of testing for drugs. Recent methods of detecting pregnancy have also come to rely upon samples of urine from the animal.

Obviously, any testing of the urine sample relies upon a urine sample which is free of fecal matter, or any other matter which may effect the test results.

While other devices are known in the prior art for the collection of urine samples, the majority are difficult to fit to the animal, and are typically difficult to remove without contaminating the urine sample.

It is therefore a general object of the present invention to provide an improved urine sample collection device for quadrupeds.

Another object is to provide an urine sample collection device which has an easily removable collection bag.

A further object of the present invention is to provide a urine collection device which is easily adjusted while on the animal.

Still another object is to provide a urine sample collection device with easily sealable collection bags.

Yet another object of the present invention is to provide a urine collection device which does not intrude or touch the underside of the animal.

Still another object is to provide a urine collection device which prevent contaminants from entering the urine sample.

These and other objects of the present invention will be apparent to those skilled in the art.

SUMMARY OF THE INVENTION

The urine collection device of this invention includes a disposable collection bag which is removably mounted on a framework of flexible straps. The collection bag has a front portion and a back portion, the back portion extending upwardly beyond the front portion to form a back flap. The front and back portions are sealed along the bottom and sides so as to form a container, the container having a continuous fastener along the open top portion to selectively seal the container. The bag has a snap fastener in each of the four corners which may be selectively connected to cooperable snaps on the strap framework. The strap framework has a pair of horizontally oriented straps with clamps at each end, the clamps being connectable to a horse blanket draped over a horse. Each horizontal strap has a slide buckle so as to allow for the adjustment and length of the strap for different size horses.

The collection bag is attached to the strap framework with the container portion facing the horse and with the flap portion at the top. When the horse urinates, the urine contacts the back flap and flows into the collection bag. The back flap also serves to deflect any fecal matter from the horse, to maintain a pure sample. The urine sample is then sealed in the bag by closing the continuous fastener. The bag may be removed from the strap framework and replaced with another bag as desired.

DESCRIPTION OF THE PREFERRED EMBODIMENT

Figure 1:
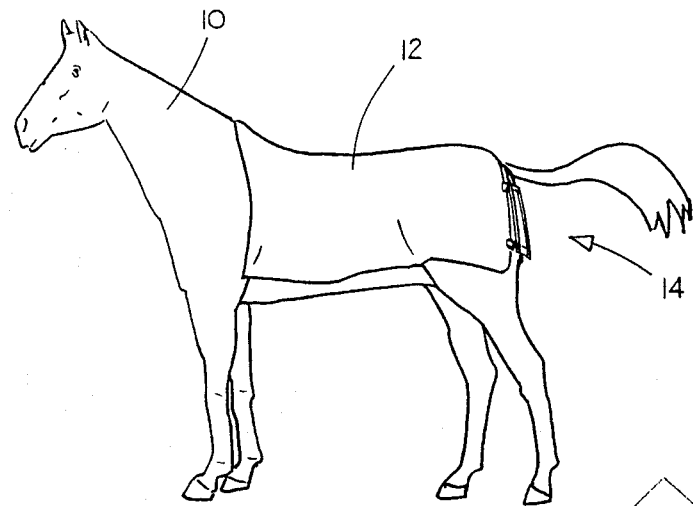
FIG. 1 is a perspective view of a horse with the urine sample collection device of this invention attached thereto.
Figure 2:
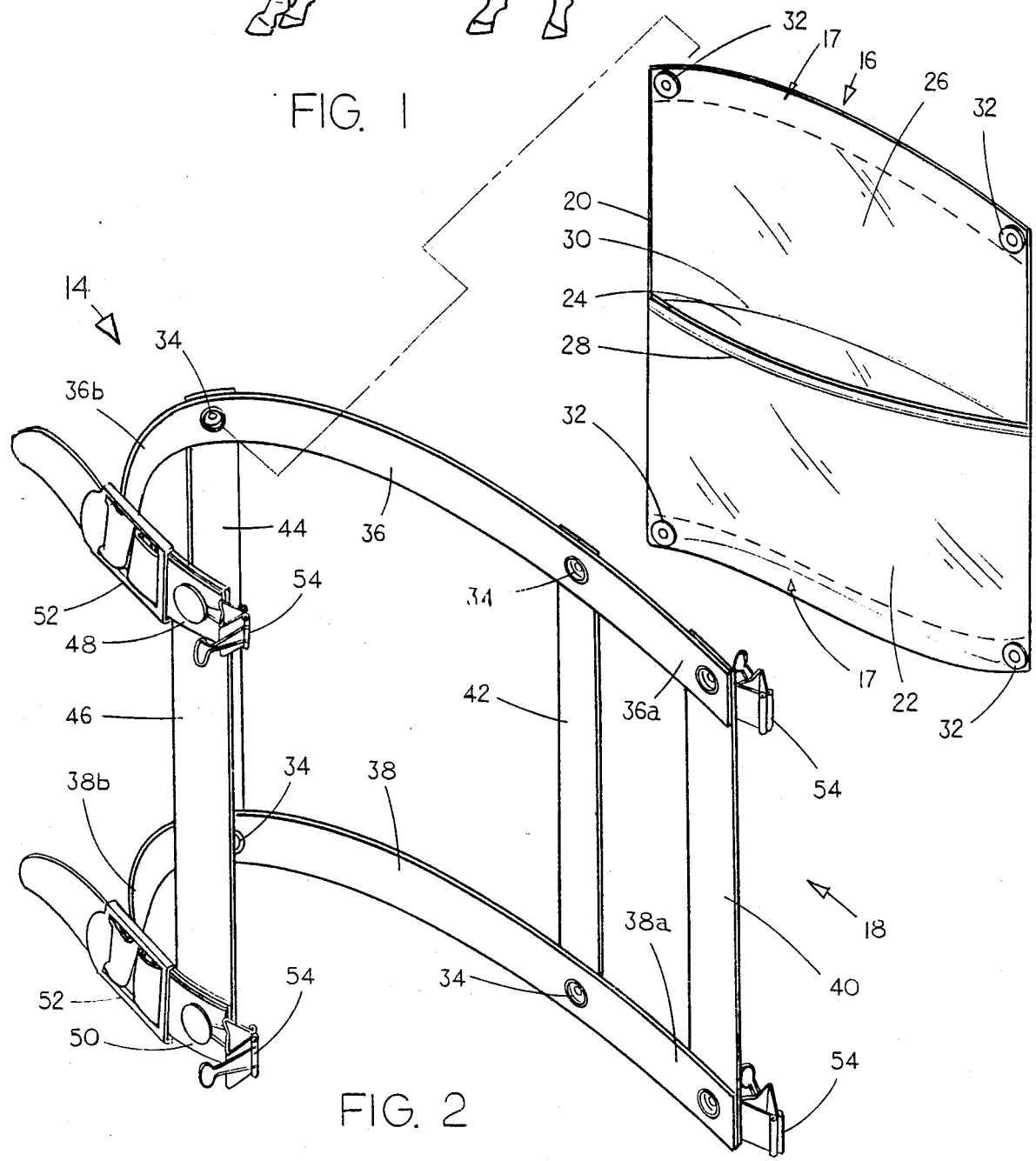
FIG. 2 is an exploded perspective view of the urine collection device of the this invention.

Referring now to the drawings, in which similar or corresponding parts are identified by the same reference numeral, and more particularly to FIG. 1, a horse 10 is shown wearing a conventional horse blanket 12 with the urine collection apparatus attached thereto and designated generally at 14. As can be seen in the drawings, collection apparatus 14 collection apparatus attached thereto and designated generally at 14. As can be seen in the drawings, collection apparatus 14 is designed specifically for use on the female gender of horses or other quadrupeds.

Collection device 14 includes a disposable collection bag 16 which is removably attached to a framework of flexible straps, designated generally at 18. Bag 16 includes a back portion 20 and a front portion 22, the front portion being sealed to the back portion along the bottom and its vertical sides to form a container 24 open at the upper end. Back portion 20 extends upwardly past front portion 22 to form a flap 26, as shown in the drawings.

The upper end of front portion 22 has one portion 28 of coacting fasteners which are selectively engageable along the entire edge. The female portion 30 of a continuous, coacting fastener is mounted on rear portion 26 of bag 16 such that the male 28 and female 30 portions of a coacting fastener may be selectively engaged to seal the upper end of container 24. The coacting fastener 28, 30 is preferably watertight, to eliminate leaks. Each of the corners of bag 16 has the male portion 32 of a snap, which will engage the female portion 34 of the snap, arranged on the strap framework 18 as described hereinbelow.

In the preferred embodiment of the invention, collection bag 16 is formed from plastic which is four millimeters thick. A horizontal strip of additional material is affixed to the upper and lower edges of the bag, and is identified generally at 17. Strips 17 serve to increase the strength at each of the locations of snaps 32 such that the weight of a filled bag will not rip the snap from the bag. It is preferred that strip 17 be at least four millimeters thick, so as to provide a bag having a thickness of at least 8 millimeters at each of the snap locations.

Strap framework 18 includes an upper horizontally-oriented strap 36 and a lower horizontally-oriented strap 38 arranged parallel to one another. A first end 36a and 38a of horizontal straps 36 and 38 have a first vertical strap 40 affixed therebetween. Vertical strap 40 is of a length equal to the height of back portion 20 of bag 16.

A second vertical strap 42 and third vertical strap 44 are fastened between upper and lower horizontal straps 36 and 38 in parallel and spaced apart relation intermediate ends 36a, 38a and 36b, 38b of horizontal straps of 36 and 38. Vertical straps 42 and 44 are spaced apart a distance equal to the width of bag 16. Female snap portions 34 are loated at the juncture of each end of vertical straps 42 and 44 with upper and lower straps 36 and 38, as shown in the drawings. A fourth vertical strap 46 has short horizontally-oriented extender straps 48 and 50 attached at its upper and lower ends, respectively.

Extender straps 48 and 50 each have a slide buckle 52 attached thereto. As can be seen in the drawings, the second ends 36b and 38b of horizontal straps 36 and 38 may be removably and adjustably fastened to slide buckles 52 on extender straps 48 and 50, respectively. Slide buckles 52 will thereby allow for adjustment of the effective lengths of straps 36 and 38.

A clamp 54 is mounted at the upper and lower ends of first vertical strap 40, each clamp 54 being oriented horizontally so as to be capable of gripping pair of clamps 54 are oriented horizontally and mounted at the upper and lower ends of fourth vertical strap 46 for the same purpose.

Figure 5:
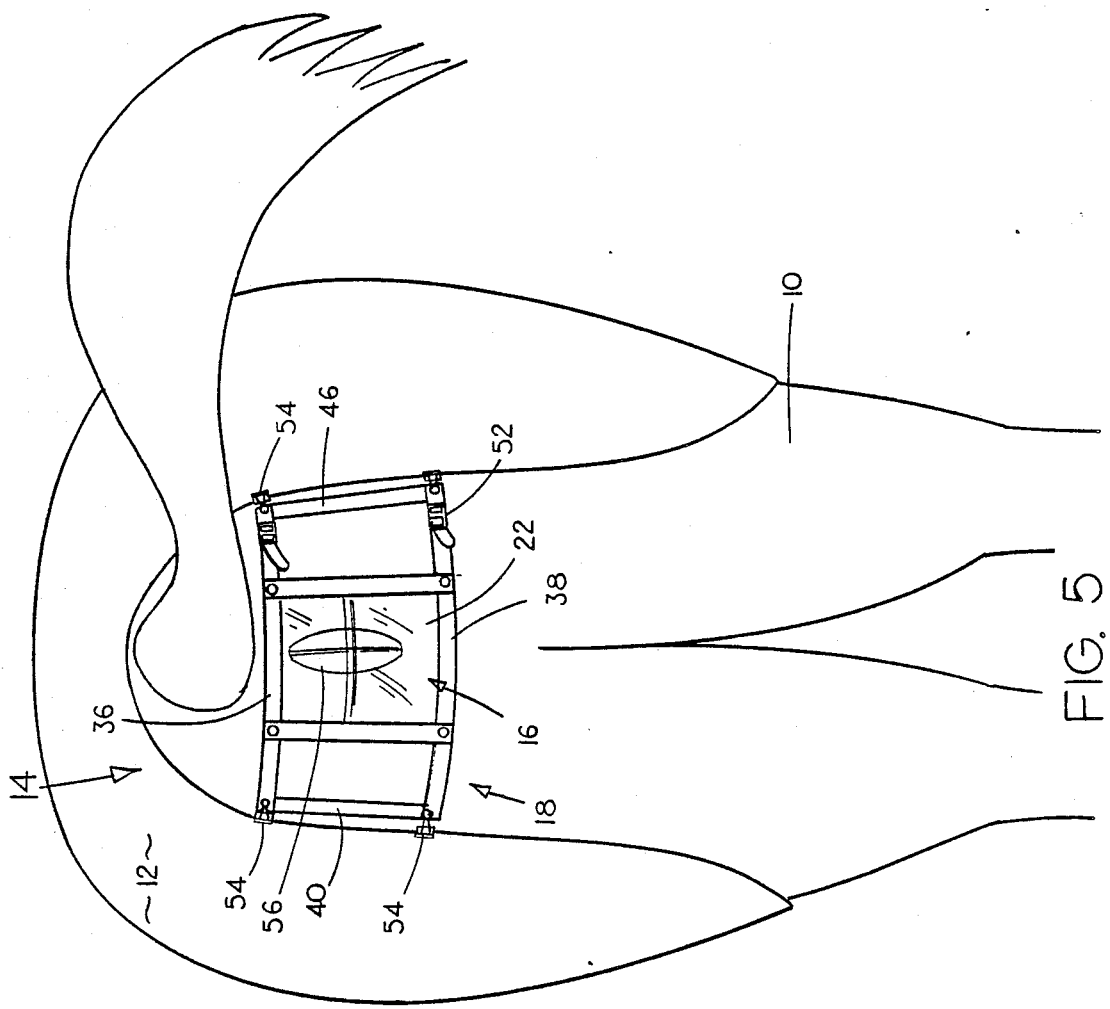
FIG. 5 is a rear view of a horse with the urine sample collection device attached thereto.
Figure 3:
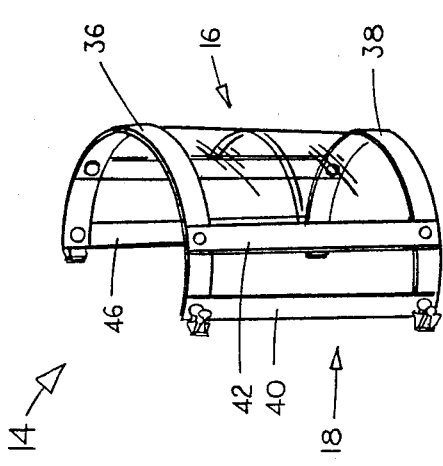
FIG. 3 is a perspective view of the urine collection device assembled in an operable position.
Figure 4:
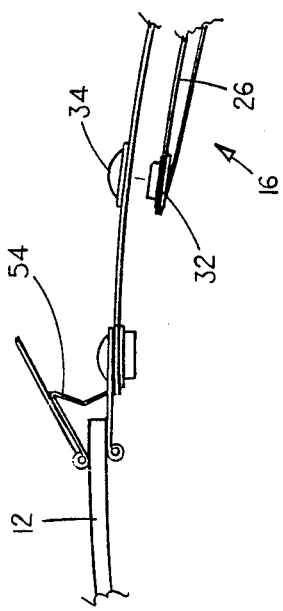
FIG. 4 is an enlarged side view of a portion of the invention showing the fasteners for attaching the disposable bags to the device.
Figure 6:
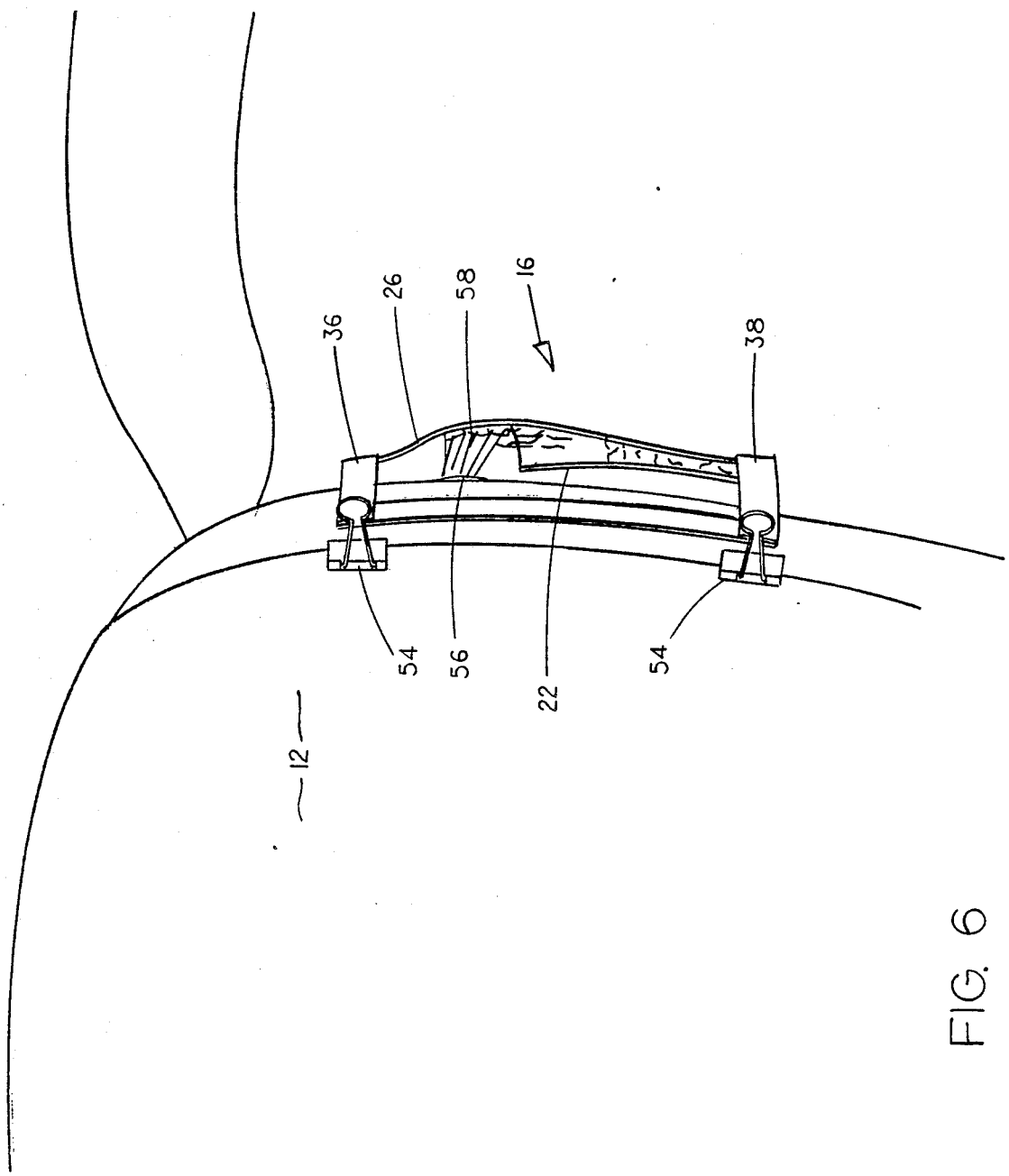
FIG. 6 is a partial side view of a horse showing the invention in use.

The collection device 14 of this invention is utilized by connecting a collection bag 16 to strap framework 18 using male and female snap portions 32 and 34. Bag 16 is connected as shown in FIGS. 3 and 6 with front portion 22 oriented toward the horse. The collection device 14 is specifically designed for use with a horse blanket 12 or the like on a horse, so that the device need not be directly strapped to the horse's body. Once bag 16 is attached to framework 18, the framework may be clipped to horse blanket 12 using clamps 54. Slide buckles 52 on upper and lower straps 36 and 38 allow for adjustment of the collection device to the size of the horse. The framework 18 is positioned such that upper strap 36 is positioned above the horse's vulva 56 and with the upper edge of forward portion 22 slightly below the vulva 56 (see FIGS. 5 and 6).

As can be seen in FIG. 6, when the horse urinates, the urine 58 will strike flap 26 causing bag 16 to open and collect urine. In addition, flap 26 will deflect feces from entering the bag 16 due to its location slightly above the vulva. Once the bag 16 has an adequate amount of urine therein, it may be removed from the strap framework 18 simply by unsnapping the male and female snap portions 32 and 34, and subsequently fastening the continuous coacting fasteners 28, 30 to seal the urine in the bag.

Whereas the invention has been shown and described in connection with the preferred embodiment thereof, it will be understood that many modifications, substitutions and additions may be made which are within the intended broad scope of the intended claims. For example, various types of fasteners may be utilized to attach bag 16 to strap work 18. Likewise, many various claimed devices may be utilized to connect strap framework 18 to the horse blanket 12. Thus, it can be seen that the urine collection device of this invention fulfills at least all of the above stated objectives.

I claim:

1. In combination:
 a horse blanket draped over a female horse;
 said horse blanket having a rearward edge with first and second spaced-apart vertical portions located on opposite sides of the horse's vulva; and
 a urine collection device detachably secured between said first and second vertical portions of said horse blanket adjacent to the horse's vulva;
 said collection device comprising:
  bag means detachably mounted to a framework of flexible straps;
  said strap framework being selectively and adjustably secured between said vertical portions of said blanket adjacent to said vulva so as to permit said bag means to collect a urine sample;
  said bag means having a back portion and a front portion and being sealed along a lower edge and two side edges to form a container open at the upper edge of said front portion;
  said back portion extending a greater length than said front portion to form a deflection flap extending upwardly beyond the upper edge of said front portion;
  said strap framework including upper and lower horizontally-oriented straps;
  means for removably securing said bag means to said strap framework, comprising:
   first coacting fastener means having a first half secured to the upper edge of said flap and a second half secured to said upper horizontal strap; and
   second coacting fastener means having a first half secured to the lower edge of said bag means and a second half secured to said lower horizontal strap;
  said bag means being removably secured to said strap framework with said front portion upper edge located parallel to, and generally midway between, said horizontal straps;
  each end of said upper and lower straps having clamping means connected thereto for removably securing said strap framework to a blanket on said horse;
  said upper strap being removably secured between said vertical portions and extending horizontally above the vulva and below the anus of the horse;
  said lower strap being removably secured between said vertical portions and extending horizontally below the horse's vulva;
  said strap framework being secured to said blanket to locate the upper edge of said front portion slightly below and adjacent to the horse's vulva with said flap extending upwardly therefrom to said upper strap, said flap located to deflect horse feces away from said container and thereby permit collection of a urine sample free from contamination.

2. The combination of claim 1, wherein said strap framework further includes a plurality of vertical straps fastened between said upper and lower straps and spaced horizontally apart on opposite sides of said bag means.

3. The combination of claim 1, wherein said upper and lower straps having length-adjusting means thereon for selectively adjusting the length of said straps.

4. The combination of claim 1, wherein said back portion of said bag means has a height and width, and wherein said upper and lower straps are set a distance apart equal to the height of said bag means.

5. The combination of claim 1, wherein said bag means further includes sealable coacting fastener means having a first half secured along the entire upper edge of said front portion, and a second half secured parallel thereto and from side to side on said back portion, to selectively close and seal said container.

6. A method for collecting a urine sample from a female horse comprising the steps of:
    providing a horse blanket with forward and rearward edges;
    draping the blanket over a female horse with the rearward edge thereof forming first and second spaced-apart vertical portions positioned on opposite sides of the horse's vulva;
    providing a urine collection device comprising;
        a collection bag means detachably mounted to a framework of flexible straps;
        said bag means having a back portion and a front portion and being sealed along a lower edge and two side edges to form a container open at the upper edge of said front portion;
        said back portion extending a greater length than said front portion to form a deflection flap extending upwardly beyond the upper edge of said front portion;
        said strap framework including upper and lower horizontally-oriented straps;
        means for removably securing said bag means to said strap framework, comprising:
            first coacting fastener means having a first half secured to the upper edge of said flap and a second half secured to said upper horizontal strap; and
            second coacting fastener means having a first half secured to the lower edge of said bag means and a second half secured to said lower horizontal strap;
        each end of said upper and lower straps having clamping means connected thereto for removably securing said strap framework to a blanket on said horse;
    connecting said bag means to said strap framework by connecting the respective coacting halves of said first and second fastener means;
    operably securing the clamping means of said flexible strap framework to said blanket vertical portions with the upper strap being positioned above said vulva so as to permit said flap to deflect feces from said container and with said upper edge of said front portion being positioned slightly below said vulva; and
    removing said bag means from said strap framework once the container has collected a urine sample.

7. The method of claim 6, wherein said bag means further includes sealable coacting fastener means having a first half secured along the entire upper edge of said front portion, and a second half secured parallel thereto and from side to side on said back portion, to selectively close and seal said container, and including the further step of connecting the respective halves of said sealable fastener means to seal the urine sample in the container.

* * * * *